United States Patent

[11] 3,591,970

| [72] | Inventor | Donald W. Davenport |
| | | 109 Oakhill Place, North Little Rock, Ark. 72116 |
| [21] | Appl. No. | 851,006 |
| [22] | Filed | Aug. 18, 1969 |
| [45] | Patented | July 13, 1971 |

[54] FISHING ROD HOLDER AND CATCHER
8 Claims, 3 Drawing Figs.

| [52] | U.S. Cl. | 43/15 |
| [51] | Int. Cl. | A01k 97/00 |
| [50] | Field of Search | 43/15, 16 |

[56] References Cited
UNITED STATES PATENTS

| 2,713,741 | 7/1955 | Gnagy | 43/16 |
| 2,781,600 | 2/1957 | McDonnell | 43/15 |
| 2,918,746 | 12/1959 | Hamrick | 43/15 |
| 3,016,648 | 1/1962 | Ingersoll et al. | 43/15 |
| 3,412,499 | 11/1968 | Pastrovich, Sr. | 43/15 |

Primary Examiner—Samuel Koren
Assistant Examiner—Daniel J. Leach
Attorneys—Clarence A. O'Brien and Harvey B. Jacobson ABSTRACT: A portable bite-responsive fishing rod support is equipped with novel coordinating facilities and provides a structurally practical automatic fish catcher. A vertical frame provides a desirable ground-supported stand. A second complemental frame provides a fishing rod holder and is responsively cradled atop the stand. A spring-loaded trigger latch is released by a trip chain actuated by the tiltable rearward part of the rod holder. When the front end of the properly cocked holder is sprung the line is forcibly yanked and the fishhook is set in the mouth of the fish.

PATENTED JUL 13 1971

3,591,970

Donald W. Davenport
INVENTOR.

BY Clarence A. O'Brien
and Harvey B. Jacobson
Attorneys

FISHING ROD HOLDER AND CATCHER

This invention relates to a portable automatic line-yanking fish catcher which is characterized, generally stated, by an upright or stand having a fishing rod holder pivotally cradled atop the stand and actuated in a generally well-known manner by bite-responsive means.

Briefly, the mechanical-type automatic hook-setting fish catcher herein disclosed has to do with a support, more particularly, an upstanding first frame which provides a stand, and a second companion frame cooperably tiltably poised atop the stand and providing the rod holder. The first frame is made of suitable rod components and the spaced parallel coplanar rods provide legs whose pointed ends are anchorable in the ground. The median portions of these legs are provided with rigidifying braces. The upper ends have bearings in which a rocker shaft has it ends journaled. The rod holder frame is preferably rectangular and median portions of the side members are perched and fixed atop the rocker shaft to accomplish the cradling and fishing rod tilting functions desired. The forward and rearward ends of the rod holder frame are properly constructed to detachably support and operate the fishing rod. A simple J-shaped or an equivalent finger provides the desired trigger latch and has one end pivoted and the other end free and resting, when cocked, on a fixed stud providing a keeper. A coil spring has a lower end fastened on one of the braces. The upper end of this spring spring is detachably operatively connected with a median portion of the trigger latch. A flexible trip member, usually a short chain, provides an operating connection between the rod holder frame and the upper coacting end of the holder frame yanking spring.

It will be noted that the leg frame which serves as the stand is made up of a pair of corresponding or duplicate rods which constitute the legs, the respective upper ends being bored to provide aligned bearings for end portions of the freely turnable rocker shaft. The trigger latch, specifically stated, is substantially J-shaped and one end portion is pivoted and freely movable to facilitate initially setting the latch in its cocked position. The main or long portion of the latch projects beyond the frame to facilitate handling and this end portion when in latched position rests freely atop a stud which constitutes a detent or keeper. Both ends of the coil spring may be provided with hooks to facilitate attaching the lower end to a lower brace and the upper end to the median portion of the trigger latch. The chain which constitutes the operating connection between the overhanging rearward end of the tiltable holder frame, can be and preferably is made up of links one of which can be detachably and adjustably connected with the hooked upper end of the tensioned spring.

Then, too, the second or tiltable frame which constitutes the rod holder has its rearward transverse end portion provided with a single eye for encircling the handgrip of the rod. The forward transverse ends of the side frame members are laterally bent and disposed in spaced parallelism to provide accommodation and retaining means for that portion of the rod which is associated therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
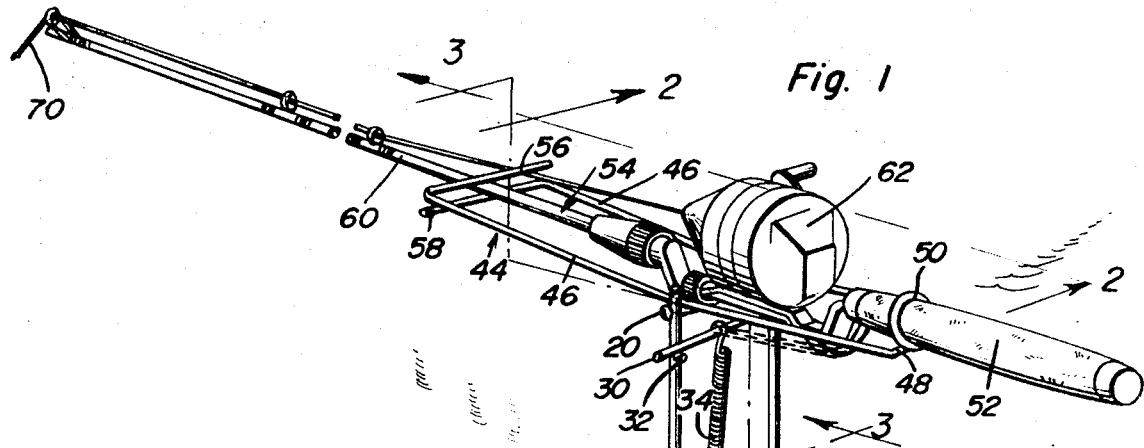
FIG. 1 is a view in perspective of the fishing rod holder and automatic catcher set up for use and with the spring-loaded trigger latch in its cocked but releasable position.
Figure 3:
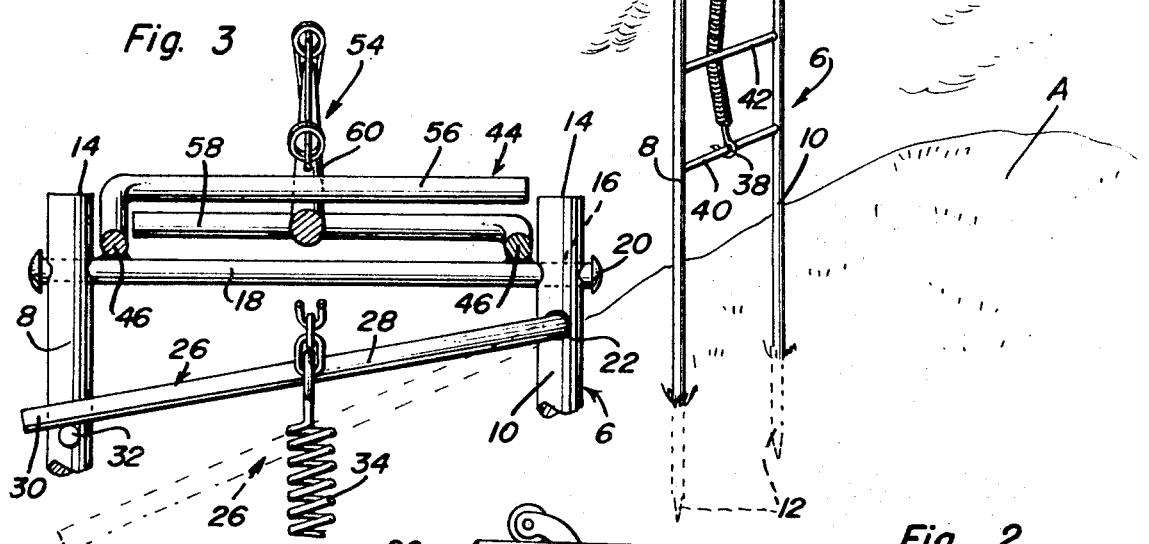
FIG. 3 is a view at right angles detailing the trigger latch and taken approximately on the plane of the section line 3–3 of FIG. 1.
Figure 2:
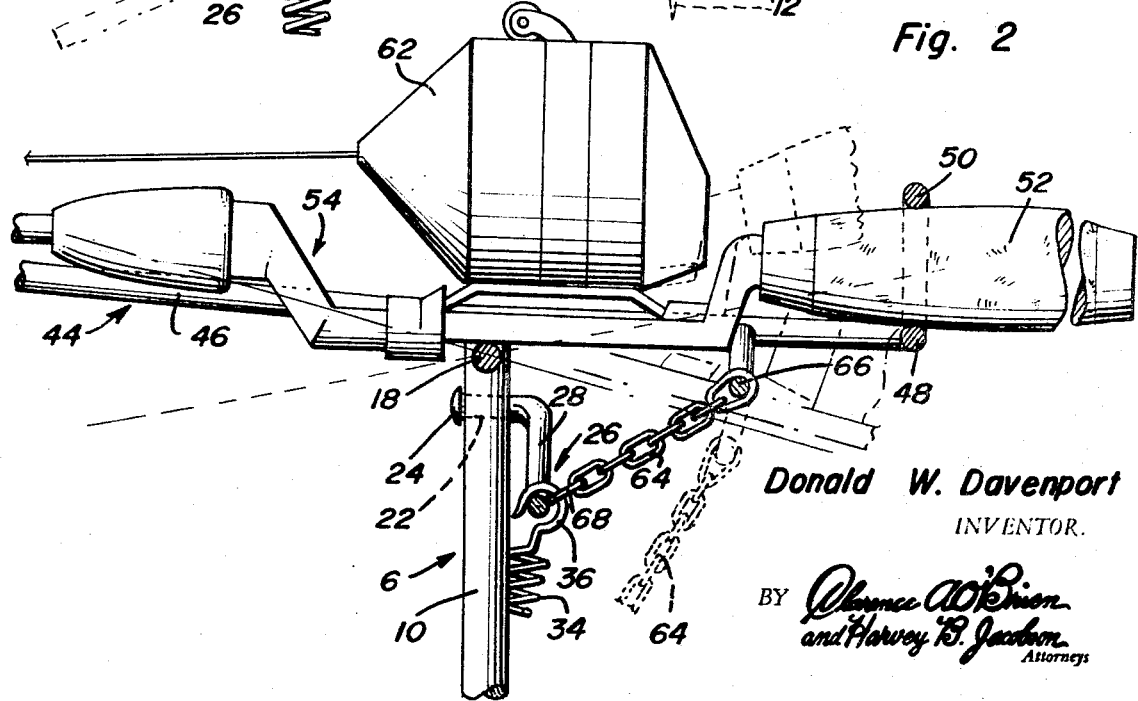
FIG. 2 is an enlarged detailed view of a fragmentary type with parts appearing in elevation and taken approximately on the plane of the longitudinal section line 2–2 of FIG. 1 looking in the direction of the arrows.

Referring now to the several views of the drawing and particularly to FIG. 1, it will be noted that the upstanding first frame is denoted, generally stated, by the numeral 6 and provides a relatively stationary stand. As suggested, it is preferably made of rod components. The main longitudinal-spaced parallel rods constitute legs with one at the left denoted by the numeral 8 (FIG. 1) and the leg at the right by the numeral 10. These legs or rods are identical in construction and have suitably pointed lower ends 12 which are adapted to penetrate the ground A in the manner shown in FIG. 1. The major portions of the legs project substantially vertically above the horizontal plane of the ground and the respective upper ends (FIG. 3) are denoted at 14 and each end is provided with a horizontal bore 16 which constitutes a bearing. These suitably aligned bearings serve to accommodate the end portions of a horizontal rod which constitutes a rocker shaft 18. The end portions are journaled in the bearings and are suitably headed as at 20. Also, as shown in FIG. 3, the leg 10 has a right-angularly disposed hole 22 passing therethrough and which serves to accommodate a lateral-headed end portion 24 of a substantially J-shaped trigger latch 26. The main limb or component 28 of this latch normally bridges the space between the two legs 8 and 10 and has an end portion 30 which is free to provide a fingergrip. This end portion, when the latch is set, rests atop a stop lug 32 which constitutes an appropriate keeper or detent. The spring means comprises a coil spring 34 of requisite tension and length which has a hook 36 which is releasably engageable over a median portion of the main limb of the trigger latch. This construction and arrangement is clearly brought out in FIG. 2. Then, as shown in FIG. 1, the coil spring has a similar hook 38 at the lower end which is detachably connectable with an appropriately positioned cross brace 40. This brace serves as a stabilizer and is located in parallelism beneath a similar rigidifying brace 42 which extends between and joins the legs 8 and 10.

The second companion and coacting frame is denoted by the numeral 44. This frame is elongated and generally horizontal in plan and it too is made up of a length of bent rod stock. The longitudinal side members of the frame are denoted at 46 and the rearward transverse connecting member is denoted at 48. The median part of member 48 is provided with an integral upstanding ring or eye 50 which embraces the cork or equivalent handgrip 52 of the fishing rod 54. The forward laterally bent end portions 56 and 58 are disposed in spaced-apart parallelism and serve to accommodate that portion of the rod which is denoted at 60. The reel is denoted at 62. It is evident, therefore, that the overall rod can be cooperatively associated with the frame 44 whereupon the frame constitutes the tiltable rod holder. It should be noted in FIGS. 2 and 3 that side members 46 are welded atop the respective left- and right-end portions of the rocker shaft 18. This is evident, it is believed, from FIG. 3 in particular. Sufficient portions of the tiltable frame overhang the rocker shaft to the left and right to provide the desired balance.

Taking up now the operating connection between the hook 36 and the tiltable holder frame, it will be seen that this comprises suitable flexible means. More particularly, the means constitutes a relatively short chain 64 which has one end link connected with a rigid crossmember 66. The other end portion has a terminal link 68 which is detachably connectable with the hook 36, as clearly shown in FIG. 2.

The cocked or set position of the trigger latch is properly shown in full lines in FIG. 3. The fully cocked and ready-to-use position of the stand 6 and rod holder 44 is shown in FIG. 1. On the other hand (see FIG. 2), the construction and arrangement and coaction of the parts is clearly illustrated in full and phantom lines, as is evident.

When a fish takes the hook on the line 70 (FIG. 1) and exerts an adequate tug on the line, this ever-so-slight tugging action on the rod will cause the forward portion of the holder frame 44 to pull the holder down to a point where the chain 64 will release the end portion 30 of the trigger latch from the keeper or detent 32, whereupon the spring 34 will yank the forward portion of the holder up, thus setting the fishhook (not shown) in the mouth of the fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. A mechanical-type automatic bite-responsive fishing rod support and catcher comprising a vertically elongated stand having means at its lower end permitting said stand to assume an upstanding position when ready to function, a horizontally elongated rod-cradling holder pivotally mounted intermediate its forward and rearward ends atop said stand, a pull-responsive trigger latch operatively mounted on an upper portion of said stand adjacent to but below the plane of the pivotal mounting of said rod holder, a tensioned latch-cocking and holder-yanking spring having a lower end anchored on a lower portion of said stand and an upper end operatively connected to said trigger latch, and a flexible latch-tripping member having one end secured to said holder and a second end secured to the said connected upper end of said spring, whereby when the rod is tilted by a pull on the line the flexible member will release the latch and the spring will yank the forward portion of the holder upwardly to set the fishhook in the fish's mouth.

2. The rod support and catcher defined in and according to claim 1, and wherein said trigger latch comprises a fingerlike rod member having one end pivotally mounted on a component part of said stand, the other end being freely movable in a vertical plane, the upper end of said spring being operatively connected to a median portion of the latch, and a stud fixed on said stand and providing a keeper with which the freely movable end of said trigger latch is releasably cooperable.

3. The rod support and catcher defined in and according to claim 2, and wherein the upper end of said coil spring is equipped with a hook which is releasably connectable with said trigger latch.

4. The rod support and catcher defined in and according to claim 2, and wherein the upper end of said coil spring is equipped with a hook which is releasably connectable with said trigger latch, said flexible latch-tripping member comprising a relatively short chain having a lower link detachably connected with said hook.

5. The rod support and catcher defined in and according to claim 1, and wherein said stand comprises a first frame embodying a pair of like spaced-parallel coplanar legs having pointed lower ends to penetrate the ground, a horizontal rocker shaft bridging the upper ends and rockable in bearings provided in the respective upper ends, and at least one rigidifying brace between and joined to median portions of said legs, the lower end of said spring being connected to said brace.

6. The rod support defined in and according to claim 5, and wherein said holder comprises a second frame generally rectangular in plan and embodying longitudinal side members and transverse end members, median portions of the side members being perched atop and fixed to said rocker shaft, a forward transverse end member having rod embracing and gripping fingers and the rearward transverse end member having a receiving ring for the handle of said rod.

7. A mechanical-type bite-responsive fishing rod support and automatic catcher comprising, in combination, a portable vertically elongated first frame constituting a stand and adapted when in use to assume a generally vertical position, said frame embodying a pair of corresponding spaced-parallel rod members providing legs and having pointed lower ends capable of penetrating and being embedded in the ground, a horizontal rocker shaft bridging the upper ends of the rod members and having ends journaled for free oscillation in bearings provided in said upper ends, rigidifying braces fixed horizontally between median portions of said rod members, a horizontally elongated second frame constituting a cradling holder for a fishing rod and having a median portion fixedly perched atop said rocker shaft, said second frame having means at forward and rearward ends for supportive but releasable attachment of portions of the rod thereto, a fingerlike J-shaped rod having its main portion bridging the space between said legs and providing a trigger latch and its auxiliary portion pivotally mounted in a bearing provided therefor in one of said legs, that portion of the other leg opposite and level with said bearing having a fixed outstanding stud providing a keeper seat for releasable retention of the free end of said trigger latch, a coil spring having a lower end fastened on one of said braces and an upper end operatively connected with a median portion of said trigger latch, and a flexible trip member having a lower end connected to an upper end of said spring and an upper end operatively connected to a rearward overhanging tiltable end portion of said rod holder frame whereby when the rod is tilted by a pull on the line the flexible member will release the latch and the spring will yank the forward portion of the holder upwardly to set the fishhook in the fish's mouth.

8. The rod support and catcher defined in and according to claim 7, and wherein the upper end of said coil spring is equipped with a hook which is releasably connectable with said trigger latch.